(12) United States Patent
Minami et al.

(10) Patent No.: US 10,850,565 B2
(45) Date of Patent: Dec. 1, 2020

(54) PNEUMATIC TIRE

(71) Applicant: The Yokohama Rubber Co., LTD., Tokyo (JP)

(72) Inventors: Yuji Minami, Hiratsuka (JP); Masatoshi Shimizu, Hiratsuka (JP)

(73) Assignee: The Yokohama Rubber Co., LTD.

( * ) Notice: Subject to any disclaimer, the term of this patent is extended or adjusted under 35 U.S.C. 154(b) by 166 days.

(21) Appl. No.: 15/312,595

(22) PCT Filed: May 19, 2015

(86) PCT No.: PCT/JP2015/064288
§ 371 (c)(1),
(2) Date: Nov. 18, 2016

(87) PCT Pub. No.: WO2015/178366
PCT Pub. Date: Nov. 26, 2015

(65) Prior Publication Data
US 2017/0087936 A1    Mar. 30, 2017

(30) Foreign Application Priority Data
May 20, 2014 (JP) ................................ 2014-104577

(51) Int. Cl.
*B60C 3/04*    (2006.01)
*B60C 9/04*    (2006.01)
(Continued)

(52) U.S. Cl.
CPC .................. *B60C 3/04* (2013.01); *B60C 5/14* (2013.01); *B60C 5/142* (2013.01); *B60C 9/08* (2013.01);
(Continued)

(58) Field of Classification Search
CPC ....... B60C 2011/0033; B60C 2013/007; B60C 3/04; B60C 11/0083; B60C 13/003; B60C 15/0603
(Continued)

(56) References Cited

U.S. PATENT DOCUMENTS 4,986,324 A * 1/1991 Suzuki ................ B60C 11/0306
152/209.18
6,079,465 A * 6/2000 Takeyama ............. B60C 1/0008
152/510
(Continued)

FOREIGN PATENT DOCUMENTS

CN          101432150         5/2009
EP          0128852 A2  * 12/1984  ............... B60C 3/04
(Continued)

OTHER PUBLICATIONS

International Search Report for International Application No. PCT/JP2015/064288 dated Aug. 18, 2015, 4 pages, Japan.

*Primary Examiner* — Kendra Ly
(74) *Attorney, Agent, or Firm* — Thorpe North & Western

(57) ABSTRACT

A pneumatic tire includes a tread portion, sidewall portions, bead portions, and has at least one carcass layer disposed between the pair of bead portions. The ratio SW/OD between the total tire width SW and the tire external diameter OD satisfies the relationship SW/OD≤0.3. A first region A is defined between a pair of first boundary lines (L1, L1), second regions B are defined between a first boundary line (L1) and a second boundary line (L2), and third regions C are defined on the bead toe side of the second boundary lines (L2). Defining SA, SB, and SC as the cross-sectional area (mm$^2$) of the first region A to the third region C, and defining the peripheral lengths (mm) of the first region A to third region C along the tire inner surface as
(Continued)

a, b, and c, respectively, the relationship $7.5 \leq SA/a \leq 11.5$ is satisfied.

11 Claims, 5 Drawing Sheets

(51) Int. Cl.
    *B60C 9/20*     (2006.01)
    *B60C 11/00*     (2006.01)
    *B60C 9/22*     (2006.01)
    *B60C 5/14*     (2006.01)
    *B60C 9/08*     (2006.01)
    *B60C 9/18*     (2006.01)
    *B60C 11/03*     (2006.01)
    *B60C 9/00*     (2006.01)
    *B60C 11/12*     (2006.01)

(52) U.S. Cl.
    CPC .................. *B60C 9/18* (2013.01); *B60C 9/20* (2013.01); *B60C 9/22* (2013.01); *B60C 11/033* (2013.01); *B60C 11/12* (2013.01); *B60C 2009/0035* (2013.01); *B60C 2009/0425* (2013.01); *B60C 2009/0441* (2013.01); *B60C 2009/2019* (2013.01); *B60C 2009/2214* (2013.01); *B60C 2009/2219* (2013.01); *B60C 2011/0341* (2013.01); *B60C 2011/0344* (2013.01); *B60C 2011/0353* (2013.01); *B60C 2011/0355* (2013.01); *B60C 2011/0381* (2013.01)

(58) Field of Classification Search
    USPC ........................................................ 152/454
    See application file for complete search history.

(56) References Cited

U.S. PATENT DOCUMENTS

| | | | | |
|---|---|---|---|---|
| 6,213,182 B1 * | 4/2001 | Hanya | .................. | B60C 3/04 |
| | | | | 152/454 |
| 6,488,065 B1 * | 12/2002 | Sato | .................. | B60C 9/0042 |
| | | | | 152/527 |
| 6,527,025 B1 * | 3/2003 | Minami | .................. | B60C 5/12 |
| | | | | 152/527 |
| 2001/0027836 A1 * | 10/2001 | Miyazaki | .............. | B60C 9/0007 |
| | | | | 152/450 |
| 2001/0041762 A1 * | 11/2001 | Ikawa | .................. | C08L 77/00 |
| | | | | 524/262 |
| 2004/0238094 A1 | 12/2004 | Kajita | | |
| 2009/0165914 A1 | 7/2009 | Tomoi | | |
| 2013/0042953 A1 | 2/2013 | Kuwayama | | |
| 2013/0263993 A1 * | 10/2013 | Niwa | .................. | B60C 13/002 |
| | | | | 152/523 |
| 2014/0138005 A1 | 5/2014 | Sugimoto et al. | | |
| 2014/0158263 A1 * | 6/2014 | Hatanaka | .................. | B60C 3/04 |
| | | | | 152/209.18 |
| 2014/0209228 A1 * | 7/2014 | Kuwayama | .............. | B60C 3/04 |
| | | | | 152/454 |
| 2014/0290820 A1 | 10/2014 | Hatanaka et al. | | |
| 2014/0299247 A1 | 10/2014 | Hasegawa et al. | | |

FOREIGN PATENT DOCUMENTS

| | | | | |
|---|---|---|---|---|
| JP | H05-254310 | 10/1993 | | |
| JP | H09-156313 | 6/1997 | | |
| JP | H09-286211 | 11/1997 | | |
| JP | 2002-002216 | 1/2002 | | |
| JP | 2013-060138 | 4/2013 | | |
| WO | WO 2007/126143 | 11/2007 | | |
| WO | WO 2011/135774 | 11/2011 | | |
| WO | WO-2013014950 A1 * | 1/2013 | ............... | B60C 3/04 |
| WO | WO-2013031167 A1 * | 3/2013 | ............... | B60C 3/04 |
| WO | WO 2013/065319 | 5/2013 | | |
| WO | WO 2013/065322 | 5/2013 | | |

* cited by examiner

PNEUMATIC TIRE

TECHNICAL FIELD

The present technology relates to a pneumatic tire that is ideal for fitting to a passenger vehicle as standard, and more particularly relates to a pneumatic tire that can achieve reduced tire weight, as well as steering stability and fuel economy performance.

BACKGROUND ART

Conventionally, various methods have been proposed for reducing the rolling resistance of a pneumatic tire, in order to contribute to the fuel economy performance of a vehicle. In recent years in particular, with concern for the environment increasing, there is a demand for pneumatic tires to make a greater contribution to the fuel economy of vehicles.

Reducing the air resistance around the tire by decreasing the total width (SW) and the forward projection area of a pneumatic tire is known as means for reducing the rolling resistance of a pneumatic tire (see for example International Patent Application Publication No. WO2011/135774).

However, application of the above-described means results in a pneumatic tire with a narrow total width and thus a narrow ground contact width. To maintain a certain load capacity, the outer diameter (OD) must then be increased. As a result, the ground contact length of such a pneumatic tire is made long, and the ground contact width is made narrow.

If the ground contact width of a pneumatic tire is made narrow in this way, the cornering force is reduced, and therefore there is a possibility that the steering stability will be reduced. Reducing the groove area ratio of the tread portion in order to ensure steering stability can be considered to solve this, but in this case, the fuel economy cannot be sufficiently realized due to the increase in the tire weight. Therefore, even though the air resistance can be reduced based on a narrow width and large diameter pneumatic tire, it is difficult to realize both steering stability and fuel economy performance.

SUMMARY

The present technology provides a pneumatic tire that can achieve reduced tire weight, as well as steering stability and fuel economy performance.

The pneumatic tire according to the present technology includes: a tread portion extending in the tire circumferential direction in an annular shape; a pair of sidewall portions disposed on either side of the tread portion; a pair of bead portions disposed on the inside in the tire radial direction of the sidewall portions; and at least one layer of a carcass layer disposed between the pair of bead portions; wherein the ratio SW/OD of a total tire width SW and a tire outer diameter satisfies the relationship SW/OD≤0.3;

in a tire meridian cross-section, the contour of the tread portion that forms a tread profile includes a side arc located on the outermost side in the tire width direction of the tread portion, and a shoulder arc located on the inner side in the tire width direction of the side arc; a pair of first boundary lines is defined passing through the intersection point of the extension line of the side arcs and the extension line of the shoulder arcs and perpendicular to the tire inner surface; each sidewall portion has a rim check line extending in the tire circumferential direction; in a tire meridian cross-section, a pair of second boundary lines is defined passing through the rim check lines and perpendicular to the tire inner surface; a first region is partitioned between the pair of first boundary lines; a second region is partitioned between a first boundary line and a second boundary line; a third region is partitioned on a bead toe side of a second boundary line; when cross-sectional areas (mm$^2$) of the first region through third region are SA, SB, and SC respectively, and peripheral lengths (mm) of the first region through third region along the tire inner surface are a, b, and c respectively, the ratio SA/a satisfies the relationship 7.5≤SA/a≤11.5; and the groove area ratio GR in the ground contact region of the tread portion is 25% or less.

In the present technology, by providing the pneumatic tire with a narrow width and large diameter satisfying the relationship SW/OD≤0.3 for the ratio SW/OD between the total tire width SW and the tire external diameter OD, the forward projection area of the pneumatic tire is reduced, and the air resistance can be reduced. Also, by setting the groove area ratio GR in the ground contact region of the tread portion to 25% or less, deterioration in the cornering force and steering stability due to the reduction in ground contact width can be prevented. In addition, when the pneumatic tire is partitioned with the first boundary lines and the second boundary lines into the first region to the third region, and the values are obtained by dividing the cross-sectional areas SA, SB, and SC of the first region to third region by the peripheral lengths a, b, and c along the tire inner surface of the first region to third region, by satisfying the relationship 7.5≤SA/a≤11.5 for the ratio SA/a, the volume of the first region of the pneumatic tire is reduced to the minimum necessary, the increase in tire weight associated with the reduction in the groove area ratio is minimized, and the rolling resistance can be reduced. In this way, the tire weight can be reduced and steering stability and fuel economy performance can be achieved. As a result, vehicle fuel consumption is improved, greatly contributing to resource saving and energy saving, and the emissions of carbon dioxide from the vehicle can be reduced.

Preferably, the ratio SB/b satisfies the relationship 2.0≤SB/b≤6.0. In this way, the volume of the second region of the pneumatic tire is reduced to the minimum necessary, so the tire weight and the rolling resistance can be further reduced.

Also, preferably, the ratio SC/c satisfies the relationship 4.0≤SC/c≤8.0. In this way, the volume of the third region of the pneumatic tire is reduced to the minimum necessary, so the tire weight and the rolling resistance can be further reduced.

Preferably, the grooves formed in the tread portion include at least one main groove, and when the maximum groove depth of the main groove is GDmax, 3.0 mm≤GDmax≤6.0 mm. By setting the maximum groove depth GDmax comparatively small in this way, the cornering force is increased, and the steering stability can be improved.

Preferably, at least one inclined reinforcing layer including a plurality of reinforcing cords inclining with respect to the tire circumferential direction is disposed on the outer circumferential side of the carcass layer in the tread portion. By providing the inclined reinforcing layer in this way, the cornering force is increased, and the steering stability can be improved.

Preferably, at least one circumferential reinforcing layer extending along the tire circumferential direction is arranged on the outer circumferential side of the inclined reinforcing layer. By providing the circumferential reinforcing layer in this way, the cornering power is increased, and the steering stability can be improved.

Preferably, the circumferential reinforcing layer is configured from a composite material with reinforcing cords oriented in the tire circumferential direction embedded in rubber. By increasing the in-plane bending stiffness of the inclined reinforcing layer by adding the circumferential reinforcing layer that includes reinforcing cords oriented in the tire circumferential direction, the cornering power is increased, and the steering stability can be improved.

Preferably, the reinforcing cords of the circumferential reinforcing layer are organic fiber cords. By using light organic fiber cords as the reinforcing cords of the circumferential reinforcing layer, the weight can be reduced, contributing to reduction in rolling resistance.

Preferably, an air penetration preventing layer with an air penetration coefficient of $50 \times 10^{-12}$ cc·cm/cm²·sec·cmHg or less is provided in the tire interior and/or on the tire inner surface along the carcass layer. In particular, preferably, the air penetration preventing layer is constituted from a thermoplastic resin or a thermoplastic elastomer composition in which a thermoplastic resin and an elastomer are blended. By providing the air penetration preventing layer with a lower air penetration coefficient compared with a conventional air penetration preventing layer made from butyl rubber, the air penetration preventing layer can be made thinner, so the weight can be further reduced. Note that the air penetration coefficient is the value measured in accordance with JIS (Japanese Industrial Standard) K 7126 "Testing method for gas transmission rate through plastic film and sheeting" under 30° C. temperature conditions.

The pneumatic tire according to the present technology is particularly suitable for passenger vehicles. Here, pneumatic tire for a passenger vehicle means pneumatic tires fitted as standard to passenger vehicles excluding those for emergency use, and excludes tires for emergency use or for racing.

In the present technology, the total tire width SW is the total width of the pneumatic tire including any designs located on the sidewall portions, when the pneumatic tire is assembled on a rim, inflated to 230 kPa (discretionarily set internal pressure) to specify the dimensions of the pneumatic tire, and is in an unloaded state. The tire external diameter OD is the external diameter of the pneumatic tire at this time. Note that the internal pressure of 230 kPa as described above is selected for specifying the dimensions of the pneumatic tire such as the total tire width SW and the tire external diameter OD. All the parameters of the tire dimensions stated in this Specification are specified under an internal pressure of 230 kPa and in the unloaded state. Thus, it should be understood that inflating to an internal pressure of 230 kPa is not necessary for the application of the present technology, and the pneumatic tire according to the present technology inflated to an internal pressure in the typically used range exhibits the effects of the present technology.

The rim used in the present technology has a rim diameter compatible with the inner diameter of the pneumatic tire, and has a nominal rim width corresponding to the specified rim width Rm (mm) shown in Table 2 that is the value closest to the value (Rm=K1×Sn) obtained from the product of the nominal tire section width Sn and the coefficient K1 determined from the correspondence table (Table 1) based on the aspect ratio of the tire assembled on the rim, in accordance with ISO 4000-1:2001.

TABLE 1

| Aspect ratio | K1 |
|---|---|
| 20-25 | 0.92 |
| 30-40 | 0.90 |
| 45 | 0.85 |
| 50-55 | 0.80 |
| 60-70 | 0.75 |
| 75-95 | 0.70 |

TABLE 2

| Nominal rim width | Rm(mm) |
|---|---|
| 3 | 76.2 |
| 3.5 | 88.9 |
| 4 | 101.6 |
| 4.5 | 114.3 |
| 5 | 127 |
| 5.5 | 139.7 |
| 6 | 152.4 |
| 6.5 | 165.1 |
| 7 | 177.8 |
| 7.5 | 190.5 |
| 8 | 203.2 |
| 8.5 | 215.9 |
| 9 | 228.6 |
| 9.5 | 241.3 |
| 10 | 254 |

Also, in the present technology, the groove area ratio GR is a percentage (%) of the groove area within the ground contact region to the total of the land portion area and the groove area within the ground contact region. Here, the ground contact region is the region of ground contact surface when the pneumatic tire is fitted to the rim as described above, inflated to an internal pressure of 230 kPa, and placed in contact with a flat surface with a load equivalent to 80% of the load capacity applied. The ground contact width is the maximum width in the tire width direction within the ground contact region. The ground contact length is the maximum length in the tire circumferential direction within the ground contact region.

In the present technology, the load capacity is determined based on ISO 4000-1: 1994. However, in the case of sizes for which the load capacity index is not set in this ISO standard, it shall be determined by a separate calculation taking into consideration the standards of various overseas countries, and in this case, the load capacity shall be calculated based on the standard in each country. Therefore, in the present technology, the load capacity of each tire size is calculated from the following calculation equation from "Calculation of Load Capacity" in the Commentary to JIS-D4202-1994, which is the actual load capacity equation adopted in the JIS standards. $X = K \times 2.735 \times 10-5 \times P^{0.585} \times Sd^{1.39} \times (D_R - 12.7 + Sd)$ where, X=load capacity (kg)

K=1.36

P=230 (=air pressure (kPa))

Sd=0.93×S1−0.637d

S1=S×(180°−Sin⁻¹(Rm/S))/131.4°

S=design cross-sectional width (mm)

Rm=rim width corresponding to the design cross-sectional width (mm)

d=(0.9−aspect ratio)×S1−6.35

$D_R$=reference value of rim diameter (mm)

In addition, in the present technology, the cross-sectional areas of the first region to third region are the areas projected in the tire circumferential direction in a tire meridian cross-section. Therefore, if there are circumferential grooves extending in the tire circumferential direction or lug grooves extending in the tire width direction on the tread portion, the lug groove part is included in the cross-sectional area but the circumferential groove part is excluded from the cross-sectional area.

DETAILED DESCRIPTION

Figure 1:
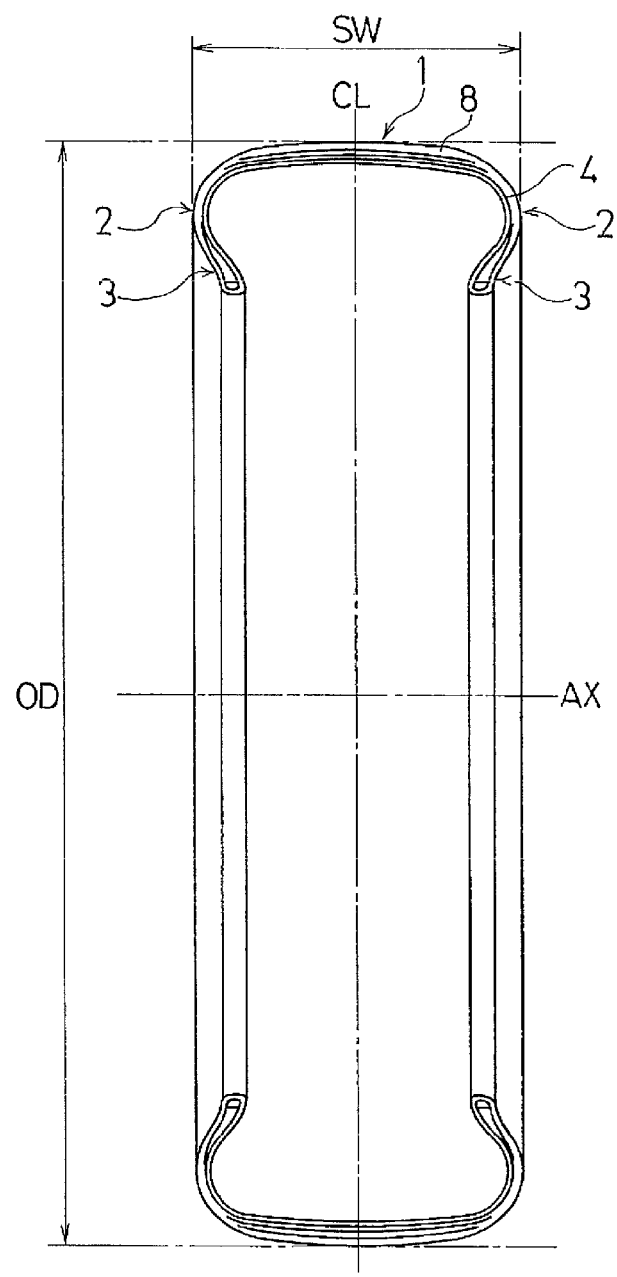
FIG. 1 is a meridian cross-sectional view illustrating a complete pneumatic tire according to an embodiment of the present technology.

A configuration of the present technology will be described below in detail with reference to the accompanying drawings. FIGS. 1 to 4 illustrate a pneumatic tire according to an embodiment of the present technology. In FIG. 1, CL is the tire equatorial plane, and AX is the tire central axis.

As illustrated in FIG. 1, the pneumatic tire of the present embodiment is provided with a tread portion 1 extending in the tire circumferential direction in an annular shape, a pair of side wall portions 2 disposed on both sides of the tread portion 1, and a pair of bead portions 3 disposed on the inner side of the side wall portions 2 in the tire radial direction.

Figure 2:
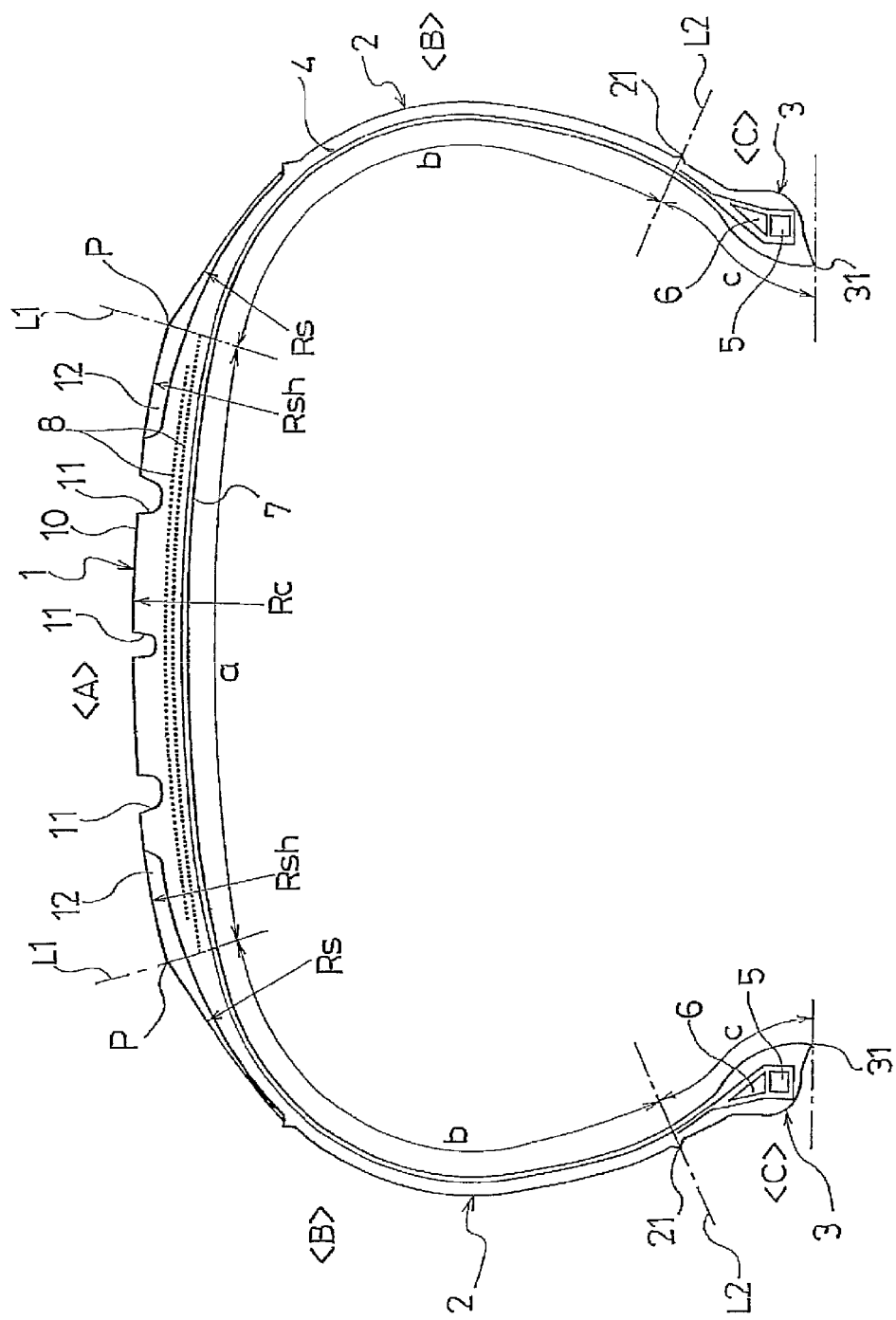
FIG. 2 is a meridian cross-sectional view illustrating the pneumatic tire of FIG. 1.

As illustrated in FIG. 2, at least one carcass layer 4 including a plurality of carcass cords that extend in the tire radial direction is laid between the pair of bead portions 3, 3. Organic fiber cords of nylon, polyester, or the like are preferably used as the carcass cords constituting the carcass layer 4. Annular bead cores 5 are embedded within the bead portions 3, and bead fillers 6 made of a rubber composition are disposed on the outer peripheries of the bead cores 5. If necessary, the bead filler 6 is disposed on the outer circumferential side of the bead core 5 in order to fill the gaps between the bead core 5 and the carcass layer 4. The bead filler 6 may or may not be provided in this way, but preferably is provided in order to prevent faults during manufacture. However, when providing the bead filler 6, for reduction in weight, preferably, the cross-sectional area thereof is made as small as possible. Also, an air penetration preventing layer 7 is provided on the tire inner surface along the carcass layer 4. The air penetration preventing layer 7 may be embedded in the tire interior along the carcass layer 4, or it may be provided on both the tire inner surface and the tire interior.

At least one inclined reinforcing layer 8 including a plurality of reinforcing cords inclined with respect to the tire circumferential direction is disposed on the outer circumferential side of the carcass layer 4 in the tread portion 1. Preferably, steel cords are used as the reinforcing cords of the inclined reinforcing layer 8 but organic fiber cords such as aramid, polyolefin ketone (POK), polyethylene terephthalate (PET), and the like can also be used.

Figure 4:
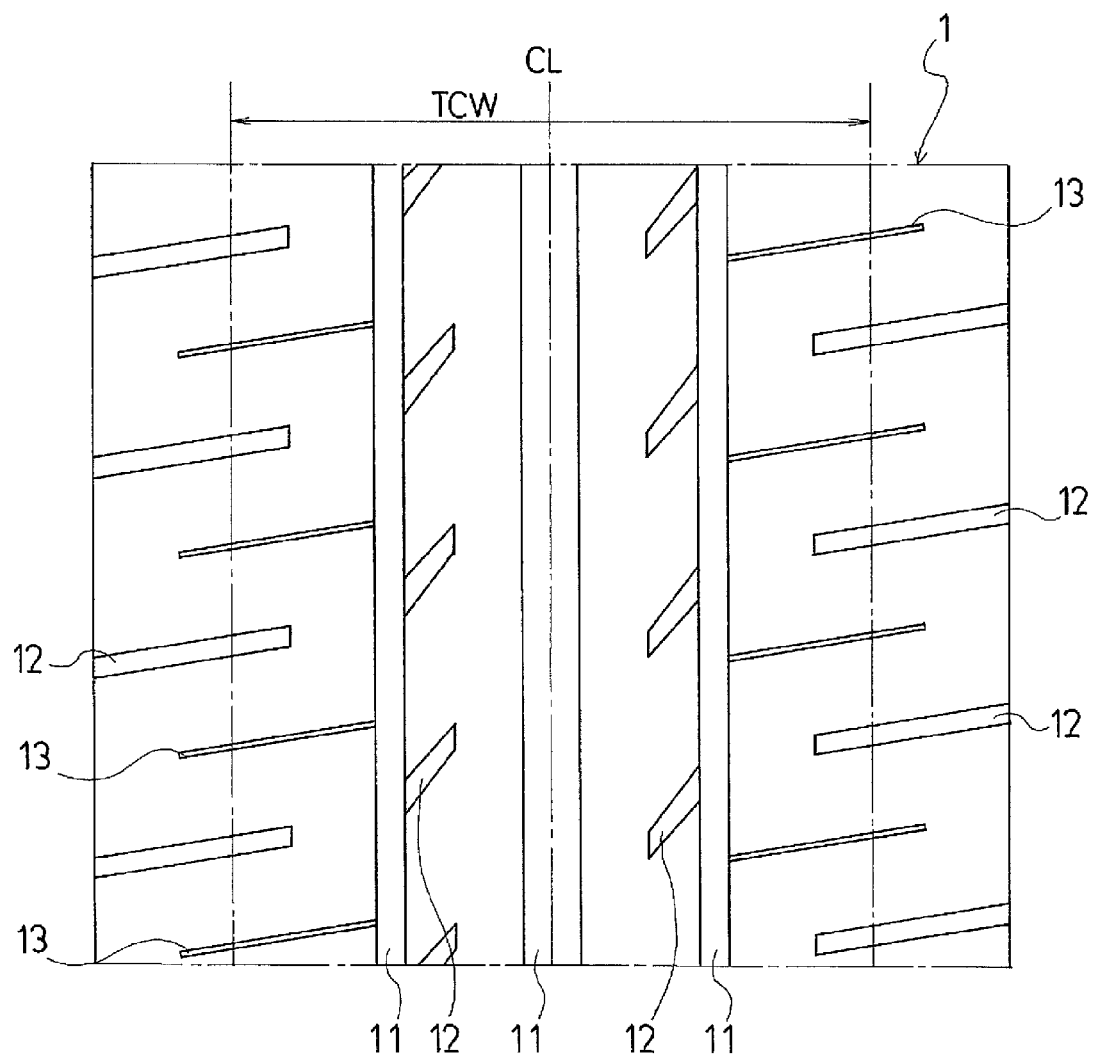
FIG. 4 is a developed view illustrating a tread pattern of the pneumatic tire of FIG. 1.

As illustrated in FIG. 4, a plurality of main grooves 11 extending in the tire circumferential direction, a plurality of lug grooves 12 extending in the tire width direction, and a plurality of sipes 13 extending in the tire width direction are formed in the tread portion 1. A predetermined tread pattern is formed by the main grooves 11, the lug grooves 12, and the sipes 13. The main grooves 11 are grooves having a width of 3 mm or more at the opening to the ground contact surface and have a slip sign, and their cross-sectional shape can be U-shaped or V-shaped, for example. Besides circumferential grooves extending in the tire circumferential direction, the main grooves 11 may be lateral grooves extending in the tire width direction, or inclined grooves extending at an inclination to the tire circumferential direction.

In the pneumatic tire as described above, the ratio SW/OD of the total tire width SW and the tire external diameter OD satisfies the relationship SW/OD≤0.3. By providing the pneumatic tire with a narrow width and large diameter in this way, the forward projection area of the pneumatic tire is reduced, and the air resistance can be reduced. Note that for practical use, the ratio SW/OD may have a lower limit value of 0.15. Also, in reducing the width and increasing the diameter of the pneumatic tire, preferably, the total tire width SW is set in the range from 125 mm to 185 mm, and the tire external diameter OD is set in the range from 650 mm to 850 mm.

Also, in the pneumatic tire as described above, in a tire meridian cross-section, a tread profile 10 that forms the profile of the tread portion 1 is formed by connecting a center arc located in the center portion in the tire width direction of the tread portion 1 and having a radius of curvature Rc, a side arc located in the outermost side in the tire width direction of the tread portion 1 and having a radius of curvature Rs, and a shoulder arc located on the inner side in the tire width direction of the side arc and having a radius of curvature Rsh. The shoulder arc is an arc that defines the profile of the road contact surface of the land portion located on the outermost side in the tire width direction of the tread portion 1, and the side arc is an arc that defines the profile of the side wall surface of the land portion located on the outermost side in the tire width direction of the tread portion 1. The center arc and the shoulder arc may be a common arc, or they may be different arcs. Another arc may be interposed between the center arc and the shoulder arc. The shoulder arc and the side arc may be connected so as to contact each other, or they may be connected so as to intersect each other. Another arc may be interposed between the shoulder arc and the side arc so that the two are smoothly connected.

Figure 3:
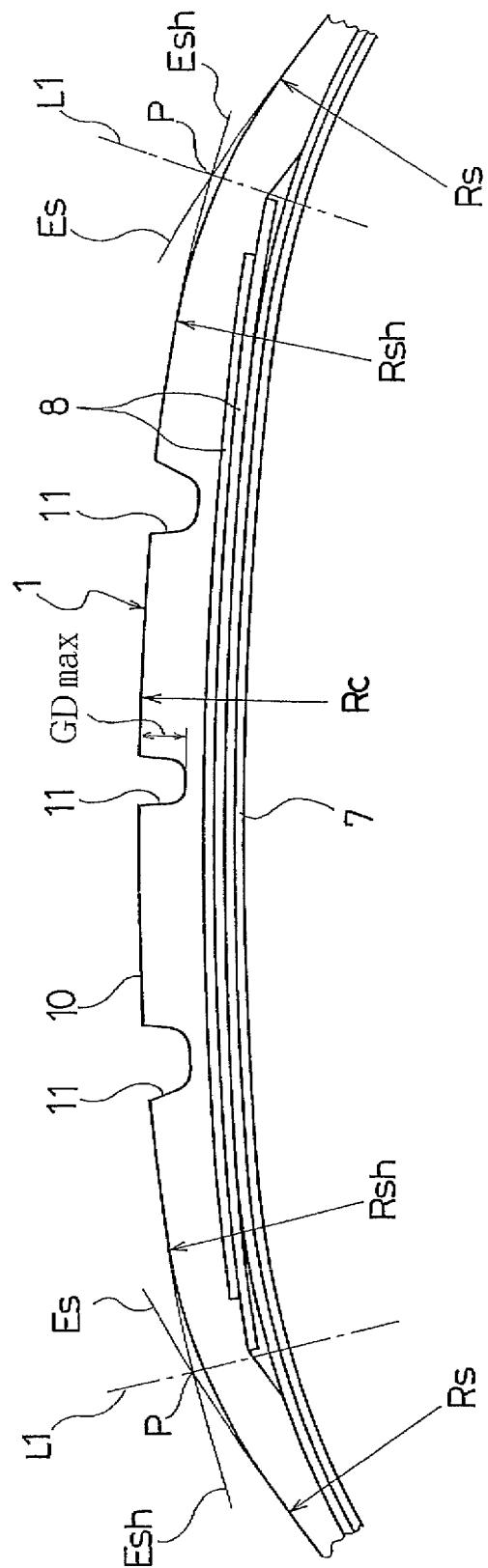
FIG. 3 is a cross-sectional view illustrating a magnified view of the tread portion of the pneumatic tire of FIG. 1.

Here, as illustrated in FIG. 3, on both sides in the tire width direction of the tread portion 1, when straight lines are drawn passing through the point of intersection P of the extension line Es of the side arc and the extension line Esh of the shoulder arc and perpendicular to the tire inner surface, a pair of first boundary lines L1 formed of the straight lines is defined. Note that when the shoulder arc and the side arc are directly connected, the point of intersection P is positioned on the tread profile 10.

On the other hand, as illustrated in FIG. 2, each sidewall portion 2 includes a rim check line 21 on the tire outer surface extending in the tire circumferential direction. This rim check line 21 is formed for confirming the fit of the tire to the rim, and is normally a ridge that protrudes from the tire outer surface. On a tire meridian cross-section, when straight lines are drawn passing through the rim check lines 21 of each sidewall portion 2 and perpendicular to the tire inner surface, a pair of second boundary lines L2 formed of the straight lines is defined.

A first region A is partitioned between the pair of first boundary lines L1, L1 a second region B is partitioned between a first boundary line L1 and a second boundary line L2, and a third region C is partitioned on the bead toe 31 side of the second boundary line L2. If the cross-sectional area (mm²) of the first region A, the second region B, and the third region C are SA, SB, and SC respectively, and the peripheral lengths (mm) along the tire inner surface of the first region A, the second region B, and the third region C are a, b, and c respectively, the pneumatic tire is configured so that the ratio SA/a satisfies the relationship 7.5≤SA/a≤11.5.

In the pneumatic tire as described above, by having the ratio SA/a satisfy the relationship 7.5≤SA/a≤11.5, the volume (the substantial average thickness) of the first region A of the pneumatic tire is reduced to the minimum necessary, so the tire weight can be greatly reduced without loss of tire performance such as the wear resistance, and accordingly the rolling resistance can be greatly reduced. Here, if the ratio SA/a of the first region A corresponding to the tread portion 1 is smaller than 7.5, the wear resistance will be reduced, and conversely if larger than 11.5, the weight reduction effect will be insufficient.

In the pneumatic tire as described above, the ratio SB/b may satisfy the relationship 2.0≤SB/b≤6.0. In this way, the volume (the substantial average thickness) of the second region B of the pneumatic tire is reduced to the minimum necessary, so the tire weight can be greatly reduced without loss of tire performance such as the cut resistance, and accordingly the rolling resistance can be greatly reduced. Here, if the ratio SB/b of the second region B corresponding to the sidewall portion 2 is smaller than 2.0, the cut resistance will be reduced, and conversely if larger than 6.0, the weight reduction effect will be insufficient.

In the pneumatic tire as described above, the ratio SC/c may satisfy the relationship 4.0≤SC/c≤8.0. In other words, by reducing the number of wire windings of the bead core 5, reducing the cross-sectional area of the bead filler 6 or reducing the thickness of the rim cushion rubber layer, the ratio SC/c may be reduced as much as possible. In this way, the volume of the third region C of the pneumatic tire is reduced to the minimum necessary, so the tire weight and the rolling resistance can be greatly reduced, without affecting the fitting characteristics, in particular, the rim disengagement resistance. Here, if the ratio SC/c of the third region C corresponding to the bead portion 3 is smaller than 4.0, the fitting characteristics will be poorer, and conversely if larger than 8.0, the weight reduction effect will be insufficient.

Note that the appropriate ranges of the cross-sectional area SA of the first region A, the cross-sectional area SB of the second region B, and the cross-sectional area SC of the third region C vary greatly depending on the tire size. However, by defining the ratios SA/a, SB/b, and SC/c from the values obtained by dividing these cross-sectional areas SA, SB, and SC by the peripheral lengths a, b, and c of the respective regions, the above action and effect can be expected regardless of the tire size.

In the pneumatic tire as described above, the tread pattern formed by various grooves including the main grooves 11, the lug grooves 12, and the sipes 13 is formed on the tread portion 1, but the groove area ratio GR in the ground contact region TCW of the tread portion 1 is set to 25% or less. By setting the groove area ratio GR in the ground contact region TCW of the tread portion 1 in this way, sufficient land portion in actual contact with the ground can be ensured, the reduction in cornering force and the degradation in steering stability can be prevented, even though the ground contact width has been reduced by the narrow width and large diameter of the pneumatic tire. Also, even when the groove area ratio GR has been set wide, the volumes of the first region A through third region C of the pneumatic tire are reduced to the minimum necessary based on the ratios SA/a, SB/b, and SC/c as described above. Therefore, the increase in the tire weight associated with the reduction in the groove area ratio GR can be minimized and the rolling resistance can be reduced. In this way, the tire weight can be reduced and steering stability and fuel economy performance can be achieved. Here, if the groove area ratio GR is greater than 25%, the steering stability improvement effect is reduced by the reduction in pattern rigidity. Note that in order to obtain good steering stability while ensuring the water drainage properties, preferably, the groove area ratio GR is 10%≤GR≤22%, and more preferably 12%≤GR≤20%.

In the pneumatic tire as described above, the main grooves 11 may have the same groove depth, or, they may have different groove depths from each other. In any case, when the maximum groove depth of the main grooves 11 is GDmax (see FIG. 3), preferably 3.0 mm≤GDmax≤6.0 mm. By setting the maximum groove depth GDmax of the main grooves 11 comparatively small in this way, the cornering force is increased, and the steering stability can be improved. Here, if the maximum groove depth GDmax of the main grooves 11 is smaller than 3.0 mm, the water drainage properties deteriorate, and conversely if greater than 6.0 mm, the steering stability improvement effect will be reduced.

In the pneumatic tire as described above, the fineness of the carcass cords of the carcass layer 4 can be selected from the range 900 dtex/2 to 2000 dtex/2, for example, and the cord count per 50 mm unit width can be selected from the range 30 to 70, for example. In particular, the fineness of the carcass cords of the carcass layer 4 may be 900 dtex/2 to 1400 dtex/2, and the cord count per 50 mm unit width may be 45 to 70. In other words, adopting finer carcass cords contributes to making the carcass layer 4 thinner and lighter, and on the other hand by increasing the cord count of the carcass cords, the necessary pressure resistance can be ensured. Here, if the fineness of the carcass cords is smaller than 900 dtex/2 it is difficult to ensure the pressure resistance, and conversely if greater than 1400 dtex/2, the weight reduction effect is reduced.

In the pneumatic tire as described above, by providing at least one inclined reinforcing layer 8 including a plurality of reinforcing cords inclined with respect to the tire circumferential direction on the outer circumferential side of the carcass layer 4 in the tread portion 1, the cornering force is increased, and the steering stability can be improved. In particular, if a plurality of inclined reinforcing layers 8 laminated in the tire radial direction is provided on the outer circumferential side of the carcass layer 4 in the tread portion 1, the stiffness of the tread portion 1 in the tire width direction is increased and the cornering force is effectively increased, and the steering stability can be further improved. However, a structure in which the inclined reinforcing layer 8 is not provided in the tread portion 1 is also possible.

The inclination angle of the reinforcing cords of the inclined reinforcing layer 8 with respect to the tire circumferential direction may be from 15° to 60°. By appropriately adjusting the inclination angle of the reinforcing cords of the inclined reinforcing layer 8, sufficient cornering force can be ensured. Here, if the inclination angle of the reinforcing cords of the inclined reinforcing layer 8 with respect to the tire circumferential direction is less than 15°, the amount of increase in the cornering power will be reduced. Conversely if the inclination angle is greater than 60°, the out-of-plane bending rigidity of the inclined reinforcing layer 8 will be reduced, so the rolling resistance will deteriorate due to the increase in ground contact length. Note that if a plurality of inclined reinforcing layers 8 is provided, preferably, the reinforcing cords of these inclined reinforcing layers 8 are inclined with respect to the tire circumferential direction between the layers in the opposite direction to each other. However, it is not necessary that the inclination angle with respect to the tire circumferential direction be the same angle. Also, in order to achieve a good balance between cornering power and rolling resistance, the inclination angle of the reinforcing cords of the inclined reinforcing layers 8 with respect to the tire circumferential direction may be from 18° to 45°.

Figure 5:
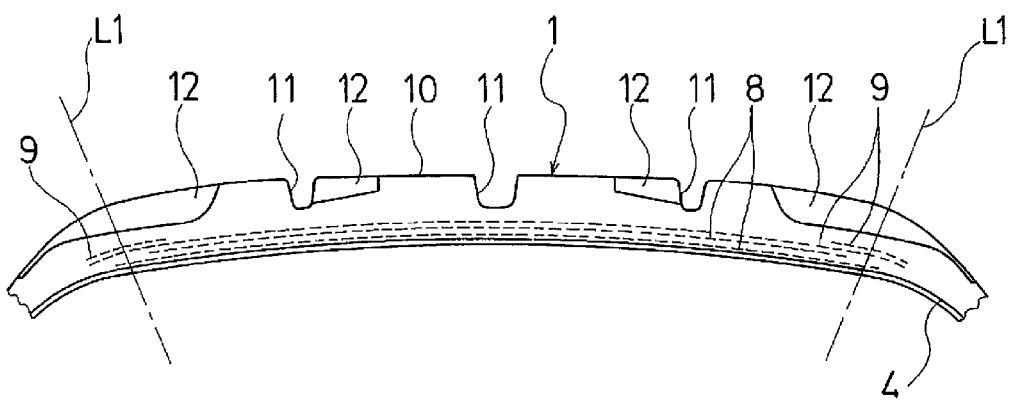
FIG. 5 is a cross-sectional view illustrating a modified example of the tread portion of the pneumatic tire of the present technology.
Figure 6:
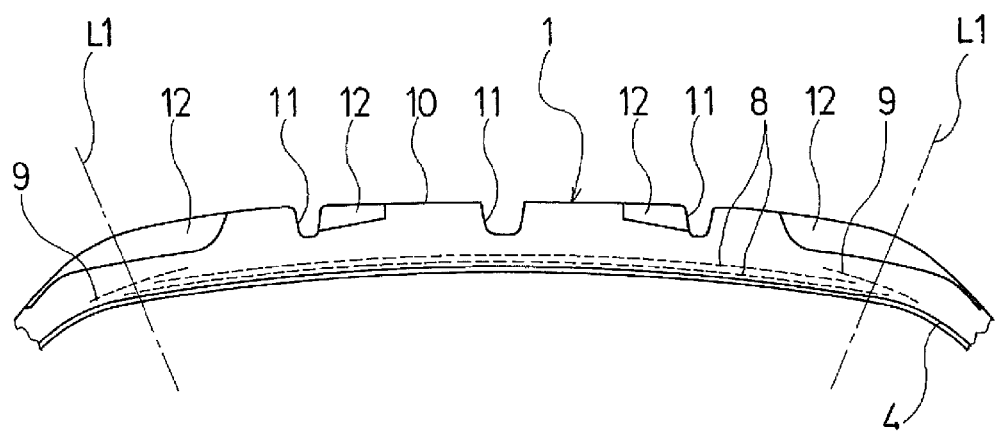
FIG. 6 is a cross-sectional view illustrating a modified example of the tread portion of the pneumatic tire of the present technology.

FIG. 5 and FIG. 6 are cross-sectional views illustrating modified examples of the tread portion of the pneumatic tire of the present technology. As illustrated in FIG. 5 and FIG. 6, at least one circumferential reinforcing layer 9 extending along the tire circumferential direction is arranged on the outer circumferential side of the inclined reinforcing layer 8. In FIG. 5, a circumferential reinforcing layer 9 includes a full cover that covers the whole area of the inclined reinforcing layer 8, and an edge cover that covers only the edge portions of the inclined reinforcing layer 8. In FIG. 6, the circumferential reinforcing layer 9 includes only the edge cover that covers only the edge portions of the inclined reinforcing layer 8. By providing the circumferential reinforcing layer 9 on the outer circumferential side of the inclined reinforcing layer 8 in this way, the cornering power is increased, and the steering stability can be improved.

Preferably, the circumferential reinforcing layer 9 is configured from a composite material with reinforcing cords oriented in the tire circumferential direction embedded in rubber. By increasing the in-plane bending stiffness of the inclined reinforcing layer 8 by adding the circumferential reinforcing layer 9 that includes reinforcing cords oriented in the tire circumferential direction, the cornering power is increased, and the steering stability can be improved. Note that a film of thermoplastic resin or a thermoplastic elastomer composition that is a blend of a thermoplastic resin and an elastomer can be used as the circumferential reinforcing layer 9.

The reinforcing cords of the circumferential reinforcing layer 9 may be organic fiber cords. By using light organic fiber cords as the reinforcing cords of the circumferential reinforcing layer 9, the weight can be reduced, and further the rolling resistance can be reduced. Ideally, organic fiber cords such as aramid, polyethylene terephthalate (PET), polyethylene naphthalate (PEN), nylon, and the like are used as the reinforcing cords of the circumferential reinforcing layer 9, but more preferably, high elasticity aramid fiber cords or composite cords with high elasticity aramid fibers intertwined with low elasticity nylon fibers are used. Note that steel cords can also be used as the reinforcing cords of the circumferential reinforcing layer 9.

In the pneumatic tire as described above, the air penetration preventing layer 7 is disposed in the tire interior and/or on the tire inner surface along the carcass layer 4, and the air penetration coefficient of the air penetration preventing layer 7 may be preferably $50 \times 10^{-12}$ cc·cm/cm²·sec·cmHg or less. In particular, the air penetration preventing layer 7 may be constituted from a thermoplastic resin or a thermoplastic elastomer composition in which a thermoplastic resin and an elastomer are blended. By providing the air penetration preventing layer 7 with a lower air penetration coefficient compared with a conventional air penetration preventing layer made from butyl rubber, the air penetration preventing layer 7 can be made thinner, so the weight can be further reduced. Here, if the air penetration coefficient of the air penetration preventing layer 7 is greater than $50 \times 10^{-12}$ cc·cm/cm²·sec·cmHg, it is difficult to further reduce the weight.

A thermoplastic resin or the thermoplastic resin composition in which a thermoplastic resin and an elastomer are blended constituting the air penetration preventing layer in the pneumatic tire of the present technology will be described below.

Examples of the thermoplastic resin preferably used in the present technology include: polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6 (MXD6), nylon 6T, nylon 6/6T copolymers, nylon 66/PP copolymers, and nylon 66/PPS copolymers); their N-alkoxyalkylated products (for example, methoxymethylated nylon 6, methoxymethylated nylon 6/610 copolymers, and methoxymethylated nylon 612); polyester resins (for example, aromatic polyesters, such as polybutylene terephthalate (PBT), polyethylene terephthalate (PET), polyethylene isophthalate (PEI), PET/PEI copolymers, polyarylate (PAR), polybutylene naphthalate (PBN), liquid crystal polyester, and polyoxyalkylene diimide diacid/polybutylene terephthalate copolymers); polynitrile resins (for example, polyacrylonitrile (PAN), polymethacrylonitrile, acrylonitrile/styrene copolymers (AS), (meth)acrylonitrile/styrene copolymers, and (meth) acrylonitrile/styrene/butadiene copolymers); polymethacrylate resins (for example, polymethyl methacrylate (PMMA), polyethyl methacrylate); polyvinyl resins (for example, polyvinyl acetate, polyvinyl alcohol (PVA), vinyl alcohol/ ethylene copolymers (EVOH), polyvinylidene chloride (PVDC), polyvinyl chloride (PVC), vinyl chloride/vinylidene chloride copolymers, vinylidene chloride/methyl acrylate copolymers, vinylidene chloride/acrylonitrile copolymers); cellulose resins (for example, cellulose acetate, and cellulose acetate butyrate); fluororesins (for example, polyvinylidene fluoride (PVDF), polyvinyl fluoride (PVF), polychlorotrifluoroethylene (PCTFE), and ethylene/tetrafluoroethylene (ETFE) copolymers); and imide resins (for example, aromatic polyimide (PI)).

Examples of elastomers used in the present technology include diene rubbers and hydrogenated products thereof (for example, natural rubber (NR), isoprene rubber (IR), epoxidized natural rubber, styrene butadiene rubber (SBR), butadiene rubber (BR, high-cis BR and low-cis BR), nitrile rubber (NBR), hydrogenated NBR, and hydrogenated SBR), olefin rubbers (for example, ethylene propylene rubber (EPDM, EPM), maleic acid modified ethylene propylene rubber (M-EPM), butyl rubber (IIR), isobutylene and aromatic vinyl or diene monomer copolymer, acrylic rubber (ACM), and ionomer), halogen-containing rubbers (for example, Br-IIR, Cl-IIR, brominated copolymer of isobutylene/para-methyl styrene (Br-IPMS), chloroprene rubber (CR), chlorohydrin rubber (CHR), chlorosulfonated polyethylene rubber (CSM), chlorinated polyethylene rubber (CM), and maleic acid modified chlorinated polyethylene rubber (M-CM)), silicone rubbers (for example, methyl vinyl silicone rubber, di-methyl silicone rubber, and methyl phenyl vinyl silicone rubber), sulfur-containing rubbers (for example, polysulfide rubber), fluororubbers (for example, vinylidene fluoride rubbers, fluorine-containing vinyl ether rubbers, tetrafluoroethylene-propylene rubbers, fluorine-containing silicone rubbers, and fluorine-containing phosphazene rubbers), thermoplastic elastomers (for example, styrene elastomers, olefin elastomers, ester elastomers, urethane elastomers, polyamide elastomers), and the like.

If a particular thermoplastic resin among those described above is incompatible with such an elastomer, a compatibilizer may be used as a third component appropriately to make the two compatible with each other. By mixing such a compatibilizer into the blend system, the interfacial tension between the thermoplastic resin and the elastomer is reduced. As a result, the rubber particles constituting the dispersion phase is made finer, so that both components can exhibit their characteristics more effectively. In general, such a compatibilizer has a copolymer structure of at least one of the thermoplastic resin and the elastomer, or a copolymer structure having an epoxy group, a carbonyl group, a halogen group, an amino group, an oxazoline group, or a hydroxyl group, which is capable of reacting with the thermoplastic resin or the elastomer. The compatibilizer can be selected depending on the type of the thermoplastic resin and the elastomer to be mixed therewith. What is normally used is styrene/ethylene-butylene-styrene block copolymers (SEBS) and their maleic acid-modified products, EPDM, EPM, EPDM/styrene or EPDM/acrylonitrile graft copolymers and their maleic acid-modified products, styrene/maleic acid copolymers, reactive phenoxine, and the like. The blending proportion of such a compatibilizer is not particularly limited, but may preferably be 0.5 to 10 parts by weight relative to 100 parts by weight of the polymer components (the total amount of the thermoplastic resin and the elastomer).

In the thermoplastic elastomer composition, the component ratio of a particular thermoplastic resin to a particular elastomer is not particularly limited, and may be appropriately set so as to have a structure in which the elastomer is dispersed as a discontinuous phase in a matrix of the thermoplastic resin. However, the preferable range is 90/10 to 15/85 in weight ratio.

In the present technology, the thermoplastic resin and the thermoplastic elastomer composition may be mixed with another polymer, for example, the above-described compatibilizer, in such an amount that the required characteristics as an air penetration preventing layer are not hindered. The purposes of mixing such a polymer are to improve the compatibility between the thermoplastic resin and the elastomer, to improve the molding workability of the material, to improve the heat resistance, to reduce cost, and the like. Examples of the material used for the polymer include polyethylene (PE), polypropylene (PP), polystyrene (PS), ABS, SBS, and polycarbonate (PC). Furthermore, a reinforcing agent such as a filler (calcium carbonate, titanium oxide, alumina, and the like), carbon black, or white carbon, a softening agent, a plasticizer, a processing aid, a pigment, a dye, or an anti-aging agent that are generally compounded with polymer compounds may be optionally compounded so long as the required characteristics as an air penetration preventing layer are not hindered.

When mixed with the thermoplastic resin, the elastomer can be dynamically vulcanized. A vulcanizer, a vulcanization aid, vulcanization conditions (temperature, time), and the like, during the dynamic vulcanization can be determined as appropriate in accordance with the composition of the elastomer to be added, and are not particularly limited.

Generally available rubber vulcanizers (crosslinking agents) can be used as the vulcanization agent. Specifically, as a sulfur-based vulcanizer, powdered sulfur, precipitated sulfur, highly dispersible sulfur, surface treated sulfur, insoluble sulfur, dimorpholine disulfide, alkylphenol disulfide, and the like can be illustrated, and, for example, approximately 0.5 to 4 phr (in the present specification, "phr" refers to parts by weight per 100 parts per weight of an elastomer component; same below) can be used.

Moreover, examples of an organic peroxide-based vulcanizer include benzoyl peroxide, t-butyl hydroperoxide, 2,4-dichlorobenzoyl peroxide, 2,5-dimethyl-2,5-di(t-butyl peroxy)hexane, 2,5-dimethylhexane-2,5-di(peroxyl benzoate), and the like. Such an organic peroxide-based vulcanizer can be used in an amount of, for example, around 1 to 20 phr.

Furthermore, examples of a phenol resin-based vulcanizer include brominated alkylphenol resins and mixed crosslinking system containing an alkyl phenol resin with a halogen donor such as tin chloride and chloroprene. Such a phenol resin-based vulcanizer can be used in an amount of, for example, around 1 to 20 phr.

Examples of other vulcanizers include zinc oxide (approximately 5 phr), magnesium oxide (approximately 4 phr), litharge (approximately 10 to 20 phr), p-quinone dioxime, p-dibenzoylquinone dioxime, tetrachloro-p-benzoquinone, poly-p-dinitrosobenzene (approximately 2 to 10 phr), and methylenedianiline (approximately 0.2 to 10 phr).

As necessary, a vulcanization accelerator may be added. As the vulcanization accelerator, approximately 0.5 to 2 phr, for example, of a generally available vulcanization accelerator of an aldehyde-ammonia base, a guanidine base, a thiazole base, a sulfenamide base, a thiuram base, a dithio acid salt base, a thiourea base, or the like can be used.

Specific examples include an aldehyde ammonia vulcanization accelerator such as hexamethylene tetramine and the like; a guanidine vulcanization accelerator such as diphenyl guanidine and the like; a thiazole vulcanization accelerator such as dibenzothiazyl disulfide (DM), 2-mercaptobenzothiazole and its Zn salt, a cyclohexylamine salt, and the like; a sulfenamide vulcanization accelerator such as cyclohexyl benzothiazyl sulfenamide (CBS), N-oxydiethylene benzothiazyl-2-sulfenamide, N-t-butyl-2-benzothiazole sulfenamide, 2-(thymol polynyl dithio)benzothiazole, and the like; a thiuram vulcanization accelerator such as tetramethylthiuram disulfide (TMTD), tetraethylthiuram disulfide, tetramethylthiuram monosulfide (TMTM), dipentamethylenethiuram tetrasulfide, and the like; a dithionate vulcanization accelerator such as Zn-dimethyl dithiocarbamate, Zn-diethyl dithiocarbamate, Zn-di-n-butyl dithiocarbamate, Zn-ethylphenyl dithiocarbamate, Te-diethyl dithiocarbamate, Cu-dimethyl dithiocarbamate, Fe-dimethyl dithiocarbamate, pipecoline pipecolyl dithiocarbamate, and the like; and a thiourea vulcanization accelerator such as ethylene thiourea, diethyl thiourea, and the like.

Additionally, a vulcanization accelerator which is generally-used for a rubber can be used. For example, zinc oxide (approximately 5 phr), stearic acid, oleic acid and their Zn salts (approximately 2 to 4 phr), or the like can be used.

The method for producing the thermoplastic elastomer composition is as follows. The thermoplastic resin and the elastomer (unvulcanized one in the case of rubber) are melt-kneaded in advance by a twin screw kneader extruder or the like. The elastomer is dispersed as a dispersion phase (domain) in the thermoplastic resin forming a continuous phase (matrix). When the elastomer is vulcanized, the vulcanizer can be added during the kneading process to dynamically vulcanize the elastomer. Although the various compounding agents (except for the vulcanizer) may be added to the thermoplastic resin or the elastomer during the kneading process, it is preferable to premix the compounding agents before the kneading process. The kneader used for kneading the thermoplastic resin and the elastomer is not particularly limited. A screw extruder, kneader, Banbury Mixer, twin screw kneader extruder, or the like can be used as the kneader. Among these, a twin screw kneader extruder is preferably used for kneading the thermoplastic resin and the elastomer and for dynamically vulcanizing the elastomer. Furthermore, two or more types of kneaders can be used to successively knead the thermoplastic resin and the elastomer. As a condition for the melt-kneading, it is preferable that a temperature be equal to or higher than a melting temperature of the thermoplastic resin. A shear rate when kneading is preferably from 1000 to 7,500 sec−1. A total kneading time is from 30 seconds to 10 minutes. Additionally, when a vulcanizing agent is added, a vulcanization time after the addition is preferably from 15 seconds to 5 minutes.

The polymer composition produced by the above method may be formed into a desired shape by a generally-used method for forming a thermoplastic resin such as injection molding and extrusion molding.

The thermoplastic elastomer composition thus obtained has a structure in which the elastomer is dispersed as a discontinuous phase in the matrix of the thermoplastic resin. By having such a structure, it becomes possible to provide the inner liner layer with sufficient flexibility and sufficient stiffness that is attributed to the effect of the resin layer as a continuous phase. Furthermore, it becomes possible to obtain, during molding, a molding workability equivalent to that of the thermoplastic resin regardless of the amount of the elastomer.

The Young's modulus in a standard atmosphere of the thermoplastic resin and thermoplastic elastomer composition as set forth in JIS K7100 is not particularly limited, but is preferably from 1 to 500 MPa, and more preferably from 50 to 500 MPa.

The thermoplastic resin or the thermoplastic elastomer composition can be formed into a sheet or film to be used as a single unit. Alternatively, an adhesive layer may be laminated thereon in order to improve the adhesiveness to the adjacent rubber. Specific examples of an adhesive polymer that constitutes the adhesive layer include an ultra high molecular weight polyethylene (UHMWPE) having a molecular weight of not less than 1,000,000 and preferably not less than 3,000,000; acrylate copolymers such as ethylene-ethylacrylate copolymers (EEA), ethylene-methylacrylate resins (EMA), and ethylene-acrylic acid copolymers (EAA), and maleic anhydrate adducts thereof; polypropylene (PP) and maleic acid-modified products thereof; ethylene-propylene copolymers and maleic acid-modified products thereof; polybutadiene resins and maleic anhydrate-modified products thereof, styrene-butadiene-styrene copolymers (SBS); styrene-ethylene-butadiene-styrene copolymers (SEBS); thermoplastic fluororesins; thermoplastic polyester resins; and the like. These polymers can be formed into a sheet or film by being extruded with, for example, a resin extruder in accordance with a generally-used method. A thickness of the adhesive layer is not particularly limited, but is preferably small in order to reduce tire weight; and is preferably from 5 μm to 150 μm.

EXAMPLES

Pneumatic tires were manufactured with a tire size of 195/65R15 or 155/55R20, including a tread portion extending in the tire circumferential direction in an annular shape; a pair of sidewall portions disposed on either side of the tread portion; a pair of bead portions disposed on the inside in the tire radial direction of the sidewall portions; one layer of a carcass layer disposed between the pair of bead portions; and an air penetration preventing layer on the tire inner surface. The ratio SW/OD of the tire total width SW and the tire outer diameter OD; the ratios SA/a, SB/b, and SC/c obtained from the cross-sectional areas SA, SB, SC ($mm^2$) and the peripheral lengths a, b, and c (mm) of the first through third regions; the groove area ratio GR; the maximum groove depth GDmax of the main grooves; the inclined reinforcing layer (number of layers, the inclination angle with respect to the tire circumferential direction of the reinforcing cords); the circumferential reinforcing layer (presence or absence, form, material); and the air penetration preventing layer (material, air penetration coefficient) were varied as shown in Table 3 to Table 5 to produce a Conventional Example, Comparative Examples 1 to 3, and Working Examples 1 to 16.

The various test tires were evaluated for tire weight, fuel economy performance, and steering stability, according to the following evaluation methods; results are shown in Table 3 to Table 5.

Tire Weight

The weight of each test tire was measured. The evaluation results were expressed, using the inverse value of the measurement value, as an index with the Conventional Example being 100. Larger index values indicate lighter tire weight.

Fuel Economy Performance

Each test tire was assembled to a wheel of rim size 15×6J or 20×5J and fitted to a front wheel drive vehicle of engine displacement 1800 cc, inflated to an air pressure of 230 kPa, driven 50 laps of a test course of total length 2 km at a speed of 100 km/h, and the fuel consumption rate (km/L) was measured. The evaluation results were expressed as an index with the Conventional Example being 100. Larger index values indicate superior fuel economy performance.

Steering Stability

Each test tire was assembled to a wheel of rim size 15×6J or 20×5J and fitted to a front wheel drive vehicle of engine displacement 1800 cc, inflated to an air pressure of 230 kPa, then three test drivers carried out sensory evaluation for steering stability by driving three laps of a test course of total length 2 km while making lane changes, and the average value of the evaluation points from the test drivers was obtained. The evaluation results were expressed as an index with the Conventional Example being 100. Larger index values indicate superior steering stability.

TABLE 3

|  |  | Conventional Example | Comparative Example 1 | Comparative Example 2 |
|---|---|---|---|---|
| Tire size | Nominal cross-sectional width | 195 | 195 | 155 |
|  | Nominal aspect ratio | 65 | 65 | 55 |
|  | Nominal rim diameter | 15 | 15 | 20 |
| SW/OD |  | 0.32 | 0.32 | 0.24 |
| SA/a |  | 13.4 | 9.4 | 14.5 |

TABLE 3-continued

|  |  |  |  |  |
|---|---|---|---|---|
| SB/b |  | 7.3 | 7.3 | 7.6 |
| SC/c |  | 10.0 | 10.0 | 10.0 |
| Groove area ratio GR (%) |  | 30 | 30 | 30 |
| Maximum depth of main grooves GDmax (mm) |  | 6.8 | 6.8 | 6.8 |
| Inclined reinforcing layer | Number of layers | 2 | 0 | 2 |
| | Inclination angle (°) | 20 | — | 20 |
| Circumferential reinforcing layer | Presence or absence | Present | Absent | Present |
| | Form | Cords | — | Cords |
| | Material | Organic fibers | — | Organic fibers |
| Material of air penetration preventing layer |  | Rubber | Rubber | Rubber |
| Air penetration coefficient of air penetration preventing layer (×10$^{-12}$ cc · cm/cm$^2$ · sec · cmHg) |  | 100 | 100 | 100 |
| Tire weight (index) |  | 100 | 110 | 105 |
| Fuel Economy Performance (index) |  | 100 | 101 | 100.5 |
| Steering Stability (index) |  | 100 | 98 | 96 |

|  |  | Comparative Example 3 | Working Example 1 | Working Example 2 | Working Example 3 |
|---|---|---|---|---|---|
| Tire size | Nominal cross-sectional width | 155 | 155 | 155 | 155 |
| | Nominal aspect ratio | 55 | 55 | 55 | 55 |
| | Nominal rim diameter | 20 | 20 | 20 | 20 |
| SW/OD |  | 0.24 | 0.24 | 0.24 | 0.24 |
| SA/a |  | 9.7 | 9.7 | 9.7 | 9.7 |
| SB/b |  | 7.6 | 7.6 | 4.7 | 4.7 |
| SC/c |  | 10.0 | 10.0 | 10.0 | 6.0 |
| Groove area ratio GR (%) |  | 30 | 20 | 20 | 20 |
| Maximum depth of main grooves GDmax (mm) |  | 6.8 | 6.8 | 6.8 | 6.8 |
| Inclined reinforcing layer | Number of layers | 0 | 0 | 0 | 0 |
| | Inclination angle (°) | — | — | — | — |
| Circumferential reinforcing layer | Presence or absence | Absent | Absent | Absent | Absent |
| | Form | — | — | — | — |
| | Material | — | — | — | — |
| Material of air penetration preventing layer |  | Rubber | Rubber | Rubber | Rubber |
| Air penetration coefficient of air penetration preventing layer (×10$^{-12}$ cc · cm/cm$^2$ · sec · cmHg) |  | 100 | 100 | 100 | 100 |
| Tire weight (index) |  | 112 | 111 | 113 | 114 |
| Fuel Economy Performance (index) |  | 101.2 | 101.1 | 101.3 | 101.4 |
| Steering Stability (index) |  | 94 | 103 | 101 | 100 |

TABLE 4

|  |  | Working Example 4 | Working Example 5 | Working Example 6 | Working Example 7 |
|---|---|---|---|---|---|
| Tire size | Nominal cross-sectional width | 155 | 155 | 155 | 155 |
| | Nominal aspect ratio | 55 | 55 | 55 | 55 |
| | Nominal rim diameter | 20 | 20 | 20 | 20 |
| SW/OD |  | 0.24 | 0.24 | 0.24 | 0.24 |
| SA/a |  | 9.7 | 9.7 | 9.7 | 9.7 |
| SB/b |  | 4.7 | 4.7 | 4.7 | 4.7 |
| SC/c |  | 6.0 | 6.0 | 6.0 | 6.0 |
| Groove area ratio GR (%) |  | 20 | 20 | 20 | 20 |
| Maximum depth of main grooves GDmax (mm) |  | 5.5 | 5.5 | 5.5 | 5.5 |
| Inclined reinforcing layer | Number of layers | 0 | 2 | 2 | 2 |
| | Inclination angle (°) | — | 20 | 20 | 20 |
| Circumferential reinforcing layer | Presence or absence | Absent | Absent | Present | Present |
| | Form | — | — | Film | Cords |
| | Material | — | — | Resin | Steel |
| Material of air penetration preventing layer |  | Rubber | Rubber | Rubber | Rubber |
| Air penetration coefficient of air penetration preventing layer (×10$^{-12}$ cc · cm/cm$^2$ · sec · cmHg) |  | 100 | 100 | 100 | 100 |
| Tire weight (index) |  | 114 | 113 | 113 | 112 |
| Fuel Economy Performance (index) |  | 101.4 | 101.3 | 101.3 | 101.2 |
| Steering Stability (index) |  | 101 | 103 | 104 | 106 |

TABLE 4-continued

|  |  | Working Example 8 | Working Example 9 | Working Example 10 |
| --- | --- | --- | --- | --- |
| Tire size | Nominal cross-sectional width | 155 | 155 | 155 |
|  | Nominal aspect ratio | 55 | 55 | 55 |
|  | Nominal rim diameter | 20 | 20 | 20 |
| SW/OD |  | 0.24 | 0.24 | 0.24 |
| SA/a |  | 9.7 | 9.7 | 9.7 |
| SB/b |  | 4.7 | 4.7 | 4.7 |
| SC/c |  | 6.0 | 6.0 | 6.0 |
| Groove area ratio GR (%) |  | 20 | 20 | 20 |
| Maximum depth of main grooves GDmax (mm) |  | 5.5 | 5.5 | 5.5 |
| Inclined reinforcing layer | Number of layers | 2 | 2 | 2 |
|  | Inclination angle (°) | 20 | 20 | 20 |
| Circumferential reinforcing layer | Presence or absence | Present | Present | Present |
|  | Form | Cords | Cords | Cords |
|  | Material | Organic fibers | Organic fibers | Organic fibers |
| Material of air penetration preventing layer |  | Rubber | Rubber | Resin |
| Air penetration coefficient of air penetration preventing layer ($\times 10^{-12}$ cc · cm/cm$^2$ · sec · cmHg) |  | 100 | 50 | 10 |
| Tire weight (index) |  | 113 | 115 | 117 |
| Fuel Economy Performance (index) |  | 101.3 | 101.5 | 101.7 |
| Steering Stability (index) |  | 105 | 105 | 105 |

TABLE 5

|  |  | Working Example 11 | Working Example 12 | Working Example 13 |
| --- | --- | --- | --- | --- |
| Tire size | Nominal cross-sectional width | 155 | 155 | 155 |
|  | Nominal aspect ratio | 55 | 55 | 55 |
|  | Nominal rim diameter | 20 | 20 | 20 |
| SW/OD |  | 0.24 | 0.24 | 0.24 |
| SA/a |  | 7.5 | 11.5 | 9.7 |
| SB/b |  | 2.0 | 6.0 | 4.7 |
| SC/c |  | 4.0 | 8.0 | 6.0 |
| Groove area ratio GR (%) |  | 20 | 20 | 10 |
| Maximum depth of main grooves GDmax (mm) |  | 5.5 | 5.5 | 5.5 |
| Inclined reinforcing layer | Number of layers | 2 | 2 | 2 |
|  | Inclination angle (°) | 20 | 20 | 20 |
| Circumferential reinforcing layer | Presence or absence | Present | Present | Present |
|  | Form | Cords | Cords | Cords |
|  | Material | Organic fibers | Organic fibers | Organic fibers |
| Material of air penetration preventing layer |  | Resin | Resin | Resin |
| Air penetration coefficient of air penetration preventing layer ($\times 10^{-12}$ cc · cm/cm$^2$ · sec · cmHg) |  | 10 | 10 | 10 |
| Tire weight (index) |  | 119 | 107 | 116 |
| Fuel Economy Performance (index) |  | 101.9 | 100.7 | 101.6 |
| Steering Stability (index) |  | 102 | 107 | 106 |

|  |  | Working Example 14 | Working Example 15 | Working Example 16 |
| --- | --- | --- | --- | --- |
| Tire size | Nominal cross-sectional width | 155 | 155 | 155 |
|  | Nominal aspect ratio | 55 | 55 | 55 |
|  | Nominal rim diameter | 20 | 20 | 20 |
| SW/OD |  | 0.24 | 0.24 | 0.24 |
| SA/a |  | 9.7 | 9.7 | 9.7 |
| SB/b |  | 4.7 | 4.7 | 4.7 |
| SC/c |  | 6.0 | 6.0 | 6.0 |
| Groove area ratio GR (%) |  | 25 | 20 | 20 |
| Maximum depth of main grooves GDmax (mm) |  | 5.5 | 3.0 | 6.0 |
| Inclined reinforcing layer | Number of layers | 2 | 2 | 2 |
|  | Inclination angle (°) | 20 | 20 | 20 |

TABLE 5-continued

| Circumferential reinforcing layer | Presence or absence Form Material | Present Cords Organic fibers | Present Cords Organic fibers | Present Cords Organic fibers |
|---|---|---|---|---|
| Material of air penetration preventing layer | | Resin | Resin | Resin |
| Air penetration coefficient of air penetration preventing layer (×10$^{-12}$ cc · cm/cm$^2$ · sec · cmHg) | | 10 | 10 | 10 |
| Tire weight (index) | | 117 | 116 | 117 |
| Fuel Economy Performance (index) | | 101.7 | 101.6 | 101.7 |
| Steering Stability (index) | | 104 | 105 | 104 |

As can be seen from Table 3 to Table 5, compared with the Conventional Example, it was possible to greatly reduce the tire weight of the tires of Working Examples 1 to 16, and moreover it was possible to achieve both steering stability and fuel economy performance.

On the other hand, with the tire of Comparative Example 1, in a pneumatic tire with the ratio SW/OD of 0.32, the same as the Conventional Example, the ratio SA/a was reduced, so although the tire weight reduction effect was obtained, the steering stability was reduced. With the tire of Comparative Example 2, although the ratio SW/OD was reduced, the ratio SA/a was too large, so the fuel economy performance improvement effect was insufficient. With the tire of Comparative Example 3, although the ratio SW/OD was small and the ratio SA/a was small, the groove area ratio GR was too large, so the steering stability deteriorated greatly.

The invention claimed is:

1. A pneumatic tire, comprising: a tread portion extending in a tire circumferential direction in an annular shape; a pair of sidewall portions disposed on either side of the tread portion; a pair of bead portions disposed on an inside in a tire radial direction of the sidewall portions; and at least one layer of a carcass layer disposed between the pair of bead portions; wherein
   a ratio SW/OD of a total tire width SW and a tire outer diameter OD satisfies a relationship SW/OD≤0.3, the total tire width SW being set in a range from 125 mm to 185 mm and the tire outer diameter OD being set in a range from 650 mm to 850 mm;
   in a tire meridian cross-section, a contour of the tread portion that forms a tread profile includes side arcs located on outermost sides in a tire width direction of the tread portion, and shoulder arcs located on an inner side in the tire width direction of the side arcs; a pair of first boundary lines is defined passing through an intersection point of an extension line of the side arcs and an extension line of the shoulder arcs and perpendicular to a tire inner surface; each sidewall portion has a rim check line extending in the tire circumferential direction; in a tire meridian cross-section, a pair of second boundary lines is defined passing through the rim check lines and perpendicular to the tire inner surface; a first region is partitioned between the pair of first boundary lines; a second region is partitioned between the first boundary line and a second boundary line; a third region is partitioned on a bead toe side of the second boundary line; when cross-sectional areas (mm$^2$) of the first region through third region are SA, SB, and SC respectively, and peripheral lengths (mm) of the first region through third region along the tire inner surface are a, b, and c respectively, a ratio SA/a satisfies a relationship 7.5≤SA/a≤11.5;
   the tread portion has a tread pattern formed by grooves, and a groove area ratio GR in a ground contact region of the tread pattern is 25% or less;
   a linear density of carcass cords of the carcass layer is from 1200 dtex/2 to 1300 dtex/2, and a cord count per 50 mm unit width of the carcass layer is from 55 to 70 cords;
   a bead filler is disposed on an outer periphery side of each of the bead cores, a height of the bead filler in the tire radial direction being less than a height of the rim check line in the tire radial direction; and
   at least one inclined reinforcing layer including a plurality of reinforcing cords inclining with respect to the tire circumferential direction is disposed on an outer circumferential side of the carcass layer in the tread portion, an inclination angle of the reinforcing cords of the at least one inclined reinforcing layer with respect to the tire circumferential direction being from 40° to 45°.

2. The pneumatic tire according to claim 1, wherein a ratio SB/b satisfies a relationship 2.0≤SB/b≤6.0.

3. The pneumatic tire according to claim 1, wherein a ratio SC/c satisfies a relationship 4.0≤SC/c≤8.0.

4. The pneumatic tire according to claim 1, wherein the grooves formed in the tread portion include at least one main groove, and when a maximum groove depth of the main groove is GDmax, 3.0 mm≤GDmax≤6.0 mm.

5. The pneumatic tire according to claim 1, wherein the groove area ratio GR in the ground contact region of the tread pattern satisfies 12%≤GR≤19%.

6. The pneumatic tire according to claim 1, further comprising an air penetration preventing layer with an air penetration coefficient of from 30×10$^{-12}$ cc·cm/cm$^2$·sec·cmHg to 50×10$^{-12}$ cc·cm/cm$^2$·sec·cmHg in a tire interior and/or on the tire inner surface along the carcass layer.

7. The pneumatic tire according to claim 1, further comprising an air penetration preventing layer with an air penetration coefficient of 50×10$^{-12}$ cc·cm/cm$^2$·sec·cmHg or less in a tire interior and/or on the tire inner surface along the carcass layer.

8. The pneumatic tire according to claim 7, wherein the air penetration preventing layer is formed from a thermoplastic resin or a thermoplastic elastomer composition in which a thermoplastic resin and an elastomer are blended.

9. The pneumatic tire according to claim 1, wherein at least one circumferential reinforcing layer extending along the tire circumferential direction is arranged on the outer circumferential side of the inclined reinforcing layer.

10. The pneumatic tire according to claim 9, wherein the circumferential reinforcing layer is configured from a composite material with reinforcing cords oriented in the tire circumferential direction embedded in rubber.

11. The pneumatic tire according to claim 10, wherein the reinforcing cords of the circumferential reinforcing layer are organic fiber cords.

* * * * *